United States Patent [19]
Pearson

[11] 3,801,077
[45] Apr. 2, 1974

[54] HUMIDIFYING APPARATUS
[76] Inventor: George Pearson, Collingham, Wetherby, England
[22] Filed: Sept. 13, 1971
[21] Appl. No.: 179,832

Related U.S. Application Data
[63] Continuation-in-part of Ser. No. 824,040, May 13, 1969, abandoned.

[30] Foreign Application Priority Data
May 15, 1968 Great Britain.................... 23023/68

[52] U.S. Cl............................ 261/139, 261/DIG. 15
[51] Int. Cl.................................................. B01f 3/04
[58] Field of Search............. 261/142, 139, DIG. 34, 261/112, DIG. 15; 21/117-119; 126/113; 219/272-275, 362; 55/444; 126/350 B

[56] References Cited
UNITED STATES PATENTS

| | | | |
|---|---|---|---|
| 859,502 | 7/1907 | Maxwell et al............... | 126/113 UX |
| 1,676,763 | 7/1928 | Anetsberger et al. ....... | 261/DIG. 34 |
| 1,687,983 | 10/1928 | Klees et al. .................. | 261/DIG. 34 |
| 1,925,907 | 9/1933 | Norris............................ | 261/90 |
| 2,888,006 | 5/1959 | Martin............................ | 126/113 |
| 3,035,145 | 5/1962 | Rudolph........................ | 219/273 |
| 3,096,817 | 7/1963 | McKenna...................... | 165/60 |

FOREIGN PATENTS OR APPLICATIONS
177,795  7/1923  Great Britain...................... 261/15

Primary Examiner—Frank W. Lutter
Assistant Examiner—Vincent Gifford
Attorney, Agent, or Firm—Fred C. Philpitt

[57] ABSTRACT

Humidifying apparatus for injecting steam into a pressure duct of an air conditioning system wherein the purity of the air must be maintained comprising a closed steam chamber and a closed water tank coupled to allow flow of water from the tank to the chamber for steaming, a steam outlet from the chamber leading to the duct and a pressure balance opening from the water tank leading to the duct so that the duct pressure is experienced in the steam chamber and water tank so that the apparatus can operate over a wide range of positive and negative pressures but is sealed to prevent ingress of bacteria from the atmosphere surrounding the apparatus, and including a float controlled water feed and an overflow pipe for the water tank said overflow pipe having its upper end open to atmosphere and its lower end below the normal operational level of the tank again to prohibit ingress of bacteria into the apparatus.

2 Claims, 9 Drawing Figures

HUMIDIFYING APPARATUS

This invention relates to humidifying apparatus for inserting steam into a pressure duct or passage of an air conditioning system wherein the air must be maintained free of dust and bacteria and constitutes a continuation-in-part of my application serial No. 824,040 filed May 13, 1969 and now abandoned.

Many forms of steam generating apparatus for the purposes of humidifying atmospheres have already been proposed, and these vary widely in shape, construction principle and purpose of operation.

BACKGROUND OF THE INVENTION

The invention precedes from the requirement to provide a humidifying apparatus by which steam of high purity can be injected into a duct of an air conditioning system, the requirements being that the apparatus should operate over a range of positive and negative pressures and also that the apparatus should operate to preclude effectively the ingress of dust, bacteria and other air-bourne foreign bodies.

Accordingly, the invention provides humidifying apparatus for injecting steam into a duct of an air conditioning system which carries a flow of air the pressure of which may lie in a range of pressures extending from above to below atmospheric pressure, such apparatus comprising a closed steam generating chamber having heating means therein for producing steam, a closed water tank, means connecting the steam generating chamber and water tank whereby water can pass from the water tank to the steam generating chamber, a level controlled valve in the water tank for cutting off the supply of water to the water tank when the level of water in such tank and hence in said steam generating chamber reaches a predetermined level, an overflow pipe associated with said water tank, said overflow pipe having its lower end in hydraulic communication with the interior of the water tank and located sufficiently below said pre-determined level to accommodate the minimum pressure of said range without allowing air to be drawn into the system and its upper overflow outlet end open to atmosphere and located sufficiently above said pre-determined level to accommodate the maximum pressure of said range without allowing spillage of water out of the overflow pipe, a steam outlet from the steam generating chamber which is for communication with the interior of the air duct so that steam produced in the chamber can be injected into the air flow in the duct, and a pressure balance opening in the water tank above said predetermined level for communication with the air duct whereby the pressure in the air duct will be applied both to the water in the steam generating chamber and the water in the water tank.

The closed steam and water tanks in combination with the overflow pipe enable the apparatus not only to operate over the pressure range of operation of the duct, but also to inhibit ingress of duct bacteria and other air-bourne foreign bodies. As the pressure rises and falls in the duct, so the pressure in the steaming chamber and water tank rises and falls accordingly, the overflow pipe permitting the rising and falling of the level in the water tank and steaming chamber whilst preventing the ingress into the duct of bacteria or other air-bourne foreign bodies.

An embodiment of the invention and modifications thereof will now be described, by way of example, with reference to the accompanying drawings, wherein.

Figure 1:
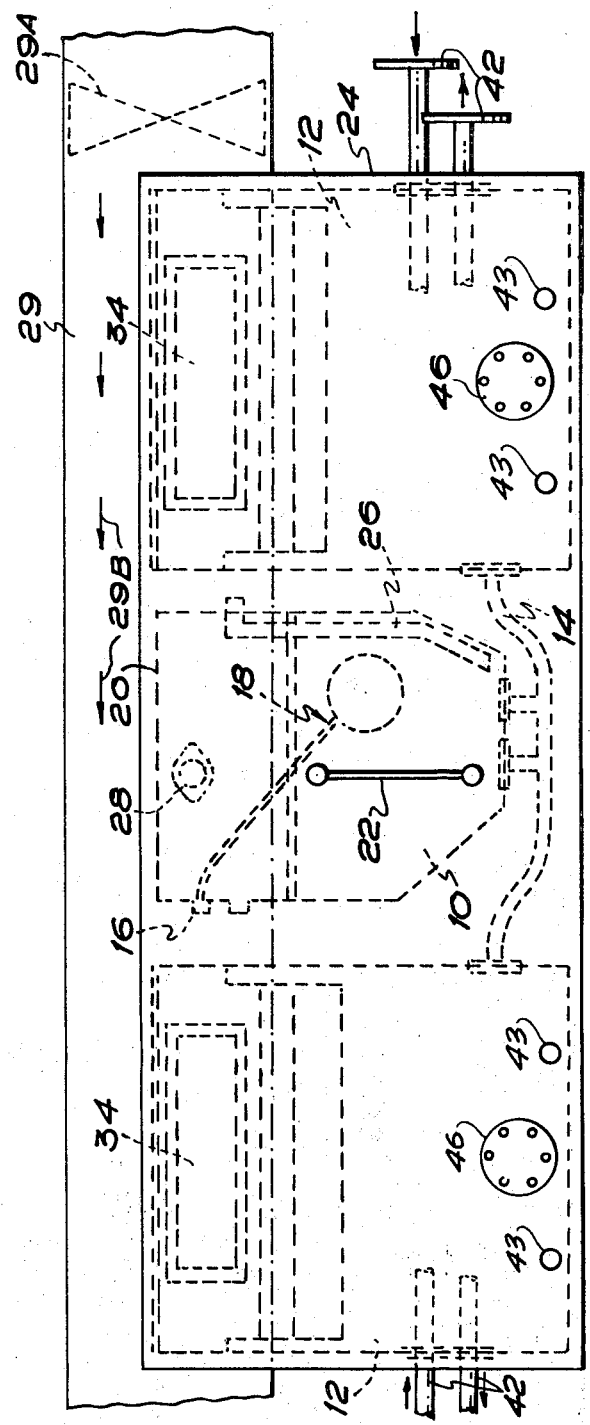
FIG. 1 is a diagrammatic side elevation of a humidifying apparatus according to the invention.
Figure 2:
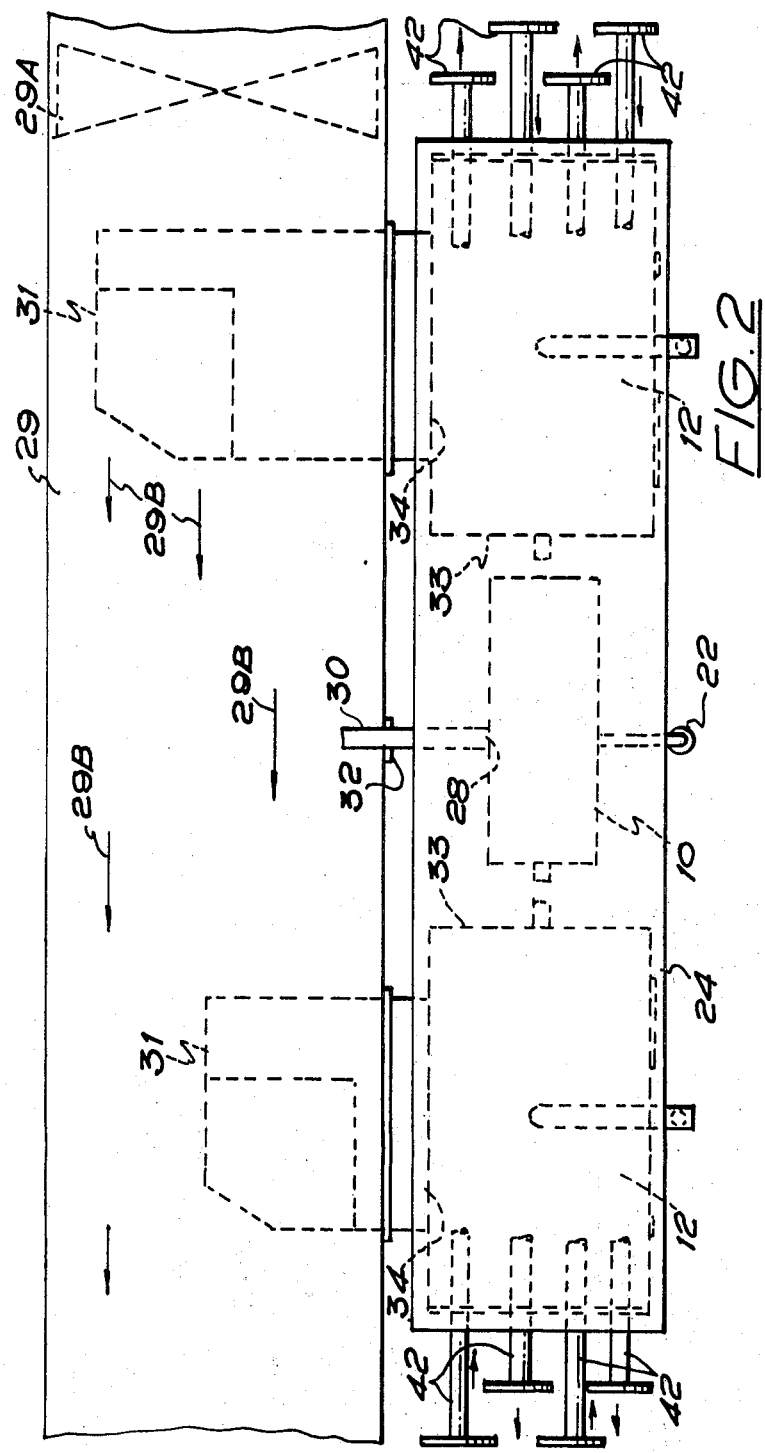
FIG. 2 is a diagrammatic plan of the apparatus shown in FIG. 1 connected to an air duct of an air conditioning system.
Figure 3:
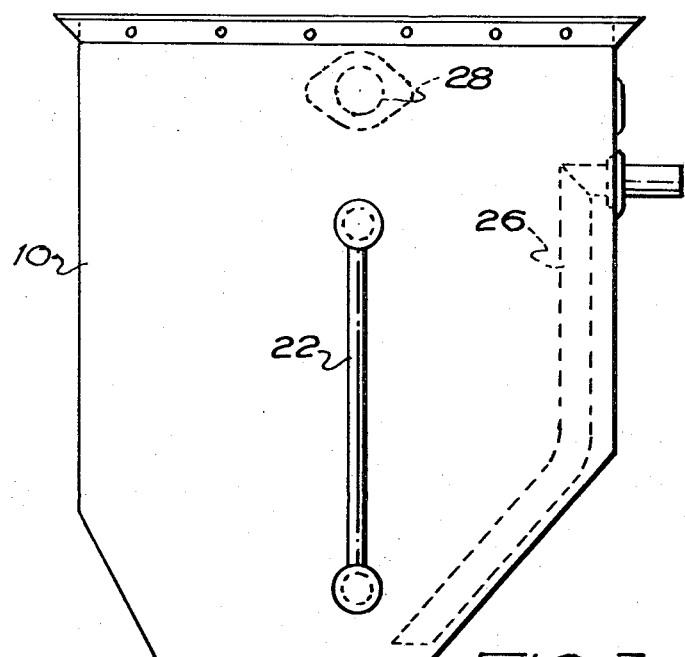
FIG. 3 is a side elevation of the cold water tank shown in FIG. 1.

FIGS. 6 to 9 respectively are perspective views of different steam injection ducts any of which may extend onto the air duct and which may be used with the apparatus of FIGS. 1 and 2;

Referring to FIGS. 1 to 3, the humidifying apparatus comprises a closed cold water tank 10 and on each side thereof, a closed steam generating compartment 12. These two compartments 12 are identical and therefore the description of one will suffice for both. Indeed, the apparatus may be operated or simply provided with only one compartment 12 if desired. The compartments 12 receive water from the cold water tank 10 from connecting piping 14 leading from the bottom of tank 10 to the bottom end of each compartment 12.

The water tank 10 receives cold water from a supply pipe and through a float controlled valve, indicated at 16, in FIG. 1 which is similar in principle to an ordinary domestic cistern valve, the float and arm being indicated as at 18. By utilizing a float controlled valve 16, it is ensured that the tank 10 fills only to a predetermined level and by regulations, this valve 16 is located above the predetermined level to prevent any siphoning back of the water in the tank into the water mains supply. The tank 10 is closed by a top cover 20 which seals the top end of the tank 10 so that the pressure in the tank 10 above the water level can vary within limits.

The tank 10 has a gauge glass 22 by which the level of water therein can be visually checked. This glass 22 is located outside, as shown in FIG. 2, a sheet metal casing 24 in which the tank 10 and compartments 12 are located.

Figure 4:
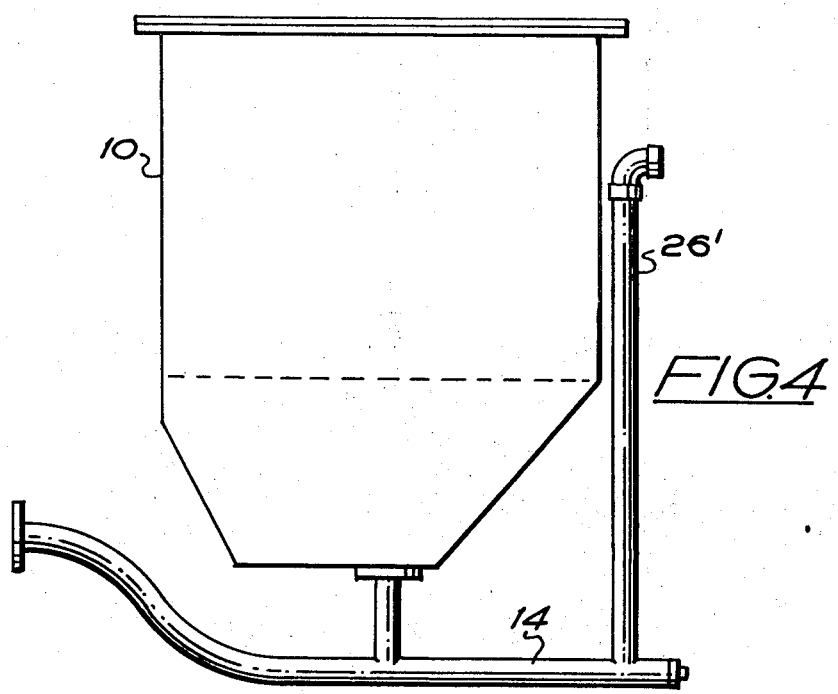
FIG. 4 is a side elevation of a modified cold water tank.

Within the tank 10 is an overflow in the form of an overflow pipe 26 which is upright and extends from the bottom of tank 10, i.e., below said predetermined level, to above such level. The lower end of the overflow pipe is in hydraulic communication with the interior of water tank 10 and for each case, this lower end is located sufficiently below the predetermined normal level of water in tank 10 to accommodate the minimum pressure of the range over which the air conditioning system is designed to operate without allowing air to be drawn into the system and the upper end of the overflow pipe is open to atmosphere and is located sufficiently above said predetermined level to accommodate the maximum pressure of said range without allowing spillage of water out of the overflow pipe, but to allow water to flow off in the event of a substantial increase in the pressure tank 10 or failure of the float controlled valve 16. FIG. 4 shows a modified arrangement of the overflow pipe 26, where it is located outside tank 10 and connected to piping 14, but it functions in exactly the same manner as the pipe 26 shown in FIG. 3.

Located above the predetermined water level for tank 10 is an outlet or opening 28 which serves as a means of communication for connecting the space of tank 10 above the water level with the main duct 29 of an air conditioning system so that the pressure in the duct or passage is balanced with the pressure in tank 10 above the water level.

Fresh air flows through duct 29 being circulated by a fan 29A, the air flow being in the direction of arrows 29B. The pressure of air in duct 29 may lie in a range of pressures extending from above to below atmospheric pressure. Sealingly connected to this outlet 28 is a communicating pipe 30 which passes through a sealed joint 32 into duct 29 as shown in FIG. 2. The duct 29 is part of an air conditioning system wherein the pressure in the duct can be expected to vary in a range from above to below atmospheric pressure, and wherein the air is required to be kept pure and free from dust, bacteria and other air-bourne foreign bodies.

Each steam generating chamber 12 is defined by an upright and closed box casing 33 at the upper end of which is a steam outlet 34. The steam outlet leads into duct 29 and is sealed thereto so that the duct pressure is also experienced in each steam generating chamber 12. The compartment 12 is divided into two upright subcompartments 36 by an upright heat insulating partition 38, see FIG. 5, which is curved at the top edge towards the steam outlet 34. Also, a curved deflector plate 35 attached to the underside of the top of the casing 33 curves towards the outlet 34.

This arrangement ensures that the steam from each and both subcompartments 36 is directed to outlet 34 and into duct 29. At the lower end of each subcompartment is a removable heating coil 40 which may be an electric heating coil or a coiled pipe through which hot fluent medium, such as high pressure hot water, steam or oil may be circulated. It is preferred in this example that for each compartment 12, one heating coil 40 should be an electric heating coil and the other should be a steam heating coil, so that there is always the possibility of operating one heating coil even when for example there is no steam available for heating such as might be the case during summer months.

Under such circumstances the partition 38, which is of copper sheeting sealed at the edges to provide a hollow structure, prevents the excess loss of heat from the hot water in one subcompartment 33 to the cold water in the other subcompartment 33. The connection for the heating coils 40 are indicated at 42. Each compartment 12 is also provided with drain outlets 43 for draining the compartment for maintenance and cleaning purposes.

The opening of the drain outlets is controlled by an electrically operated valve.

Figure 5:
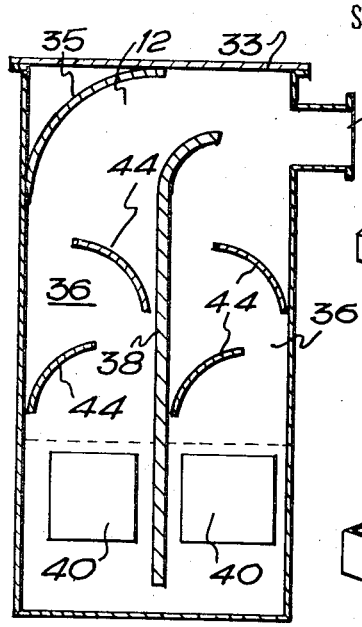
FIG. 5 is a diagrammatic sectional end elevation taken through one of the steam generating compartments shown in the apparatus of FIGS. 1 and 2.
Figure 6:
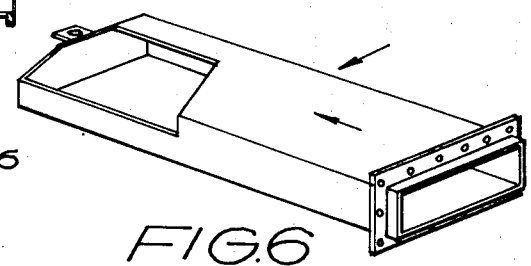
Figure 7:
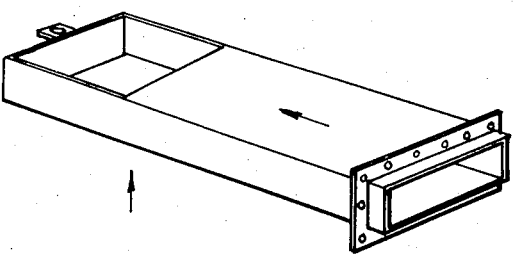
Figure 8:
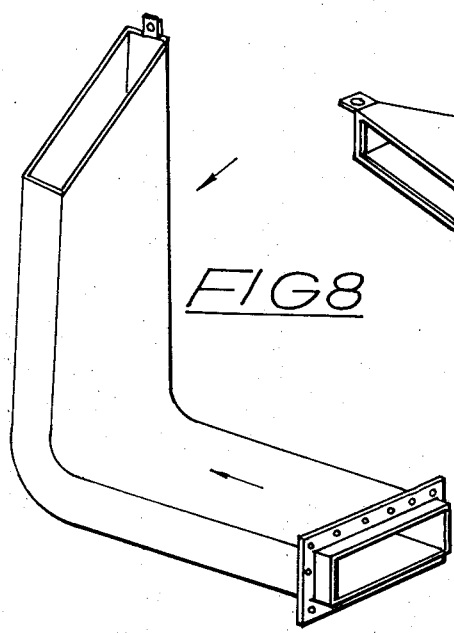
Figure 9:
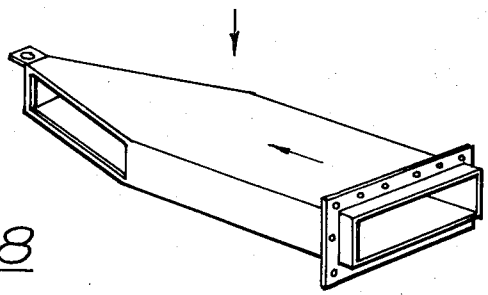

As shown in FIG. 5, the predetermined level of the water in tank 10 above which opening 28 and outlet 34 are located ensures that the heating coils 40 remain covered with water during the steam generating process, the level being so chosen that there is the minimum volume of water and maximum heating area to ensure efficient steam generation.

Located above the water level and in each subcompartment 36, are baffle plates 44 which serve to separate water from the generated steam and ensure that only steam is passed to the outlet 34. These baffle plates 44 also serve to stop the carry over to the outlet of any solids. The whole unit comprising the partition 38 and baffle plates 44 is removable for maintenance.

Each compartment 12 has extending thereinto a sludge or solids detecting probe 46, which is adapted to indicate the build up of sludge or solids in the water in the compartment by sensing the conductivity of the water. This probe could be connected to the drain outlet control valves which open automatically when the probe senses that there has been a pre-set sludge build up so that water with a heavy concentrate of solids in suspension can be flushed out of the compartment 12, and replenished with fresh water. As an alternative, the valves may simply operate automatically at pre-set intervals depending upon the characteristics of the supply water in which case the probe would not be necessary. As a further alternative, the probe could cause a visual or audible indication to be given when it detects a certain sludge or solid condition in the water in the compartment 12, so that flushing of the compartment can be carried out or initiated by manually opening the drain valves.

Each outlet 34 leads to an insertion duct 31 which projects into the air duct 29 as shown, a seal being provided between the insertion duct 31 and air duct 29. The downstream duct 31 projects to a lesser extent than the upstream duct for even mixing of the air and steam in the air conditioning system so as to maintain the air delivered by the system at the desired humidity. Examples of possible shapes of insertion duct are shown in FIGS. 6 to 9 and it will be noticed in each case the steam outlet end of each duct 31 is designed for the flow of air 29B in the duct 29 but which the duct 31 is to inject steam.

With each of the ducts 31 shown, it is so attached at an outlet 34, that any condensate collecting in the duct 31 will flow back into the compartment 12 to which the duct 31 is attached.

The casings 33 preferably have cleaning apertures which are covered by removable plates.

The apparatus of the present invention is for use in connection with air conditioning system which require to operate under pressure variations and provide a bacteria free, carefully controlled and pure atmosphere of a particular relative humidity. Such atmospheres are required in hospital operating theatres; laboratories; computer rooms; food, tobacoo, timber, textile printing or photographic materials and equipment storage and treatment rooms, or in Russian, Turkish, and Sauna bath rooms. Where the relative humidity is to remain substantially constant, there may be control means, such as a room humidistat linked to the heating coils 40 such that the steam generating rate is automatically increased or decreased depending upon the relative humidity of the atmosphere in the area or room wherein the humidity is to remain constant.

Also, as a safety measure the heating coils 40 may be so connected with the air conditioning system such that if the air conditioning system is not operative it is not possible for the heating coils 40 to deliver heat to the water surrounding same. This may be achieved for example, in the case of electric heater coils by coupling the heating coils to the main fan of the air conditioning system.

As a further safety measure where electric coils are used there may be a thermostat associated with each compartment 12 to cut off the supply of electricity to the coil when the temperature in the compartment exceeds a certain value such as might arise if the compartment were empty of water.

In a modification, tank 10 has a partition therein which defines a small chamber in the tank 10 and into which may be placed chemicals for water treatment purposes.

The apparatus is preferably constructed as far as possible in non ferrous metals and all internal surfaces which contact water are preferably capable and are tinned for hygenic purposes, or alternatively are of stainless steel.

The casing 24 is preferably heat insulated to improve the efficiency of the apparatus and prevent condensation of freshly generated steam.

In use of the humidifying apparatus, the pressure which may be above or below atmospheric, in the duct 29 into which the generated steam is being exhausted is experienced in the space in the water tank above the water level as well as in the steam chambers. This gives the advantage that the water levels in the compartment or compartments 12 and the tank 10 are maintained substantially equal, despite large positive and negative variations in the pressure in the duct or passage. This is a very important invention because the tendency today is for the ducts and passages of air conditioning systems to become smaller, giving higher velocities and consequently greater pressure variations which according to the invention are not reflected by a differential in the levels of water in the tank and steam chamber. The overflow allows the rising and falling of water levels in the tank 10 and chambers 12 within the operational pressure range of the air conditioning system and equally important there is no possible inlet route for air-borne foreign bodies, bacteria, dust, etc., which will normally be present in the atmosphere surrounding the apparatus, the steam generating apparatus normally being located remotely from the space into which the humidified air from duct 29 is exhausted.

Many modifications may be made departing from the scope of the invention, for example the shapes and positions of the various compartments, baffles, tanks and pipes could be other than those illustrated, and it is intended that all such modifications be included within the scope of this invention.

I claim:

1. An air-conditioning system comprising a duct carrying a flow of air of which the pressure may vary from above to below atmospheric and fresh steam injection apparatus located outside and adjacent to said duct for conditioning said flow of air, said humidifying apparatus comprising
   a. a sealed water tank mounted outside and adjacent said duct, said tank having a valved water inlet having a float control to maintain the water level in said tank at a predetermined level,
   b. a steam chamber means mounted outside and adjacent said duct, said steam chamber means communicating with said air duct through a baffled chamber means, said chamber further defining a lateral steam injection duct for injecting fresh steam into said air duct,
   c. means hydraulically connecting the water tank and the steam chamber to insure the steam chamber remains filled with water to a predetermined level,
   d. heating means mounted within said steam chamber below said predetermined water level,
   e. an overflow pipe having an upper overflow outlet end located above said predetermined level and below said steam injection duct, said overflow pipe having its lower end hydraulically connected to the water tank below said predetermined water level,
   f. means pneumatically connecting said water tank and said steam chamber above the water level of each with the interior of the air duct, said means including a pneumatic conduit interconnecting the interior of the air duct with the space in the sealed water tank above said predetermined water level, said pneumatic conduit and said steam injection duct providing an equal application of pressure variations in said air duct to said water tank and said steam chamber.

2. An air conditioning system as claimed in claim 1 wherein said steam chambers further comprise first and second vertical chambers with said lateral steam injection duct mounted at the top thereof, said first and second chambers each having a plurality of curved baffles therein to prevent the ingress of said water in a liquid state.

* * * * *